US008170368B2

(12) United States Patent
Yin et al.

(10) Patent No.: US 8,170,368 B2
(45) Date of Patent: May 1, 2012

(54) CORRECTING DEVICE AND METHOD FOR PERSPECTIVE TRANSFORMED DOCUMENT IMAGES

(75) Inventors: Xu-Cheng Yin, Beijing (CN); Jun Sun, Beijing (CN); Katsuhito Fujimoto, Kawasaki (JP); Hiroaki Takebe, Kawasaki (JP); Koji Kurokawa, Kawasaki (JP); Yusaku Fuji, Kawasaki (JP); Satoshi Naoi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 941 days.

(21) Appl. No.: 12/076,122

(22) Filed: Mar. 13, 2008

(65) Prior Publication Data
US 2008/0226171 A1 Sep. 18, 2008

(30) Foreign Application Priority Data
Mar. 16, 2007 (CN) .......................... 2007 1 0088355

(51) Int. Cl.
G06K 9/00 (2006.01)
G06K 9/34 (2006.01)
G06K 9/46 (2006.01)
G06K 9/66 (2006.01)
G06K 9/36 (2006.01)

(52) U.S. Cl. ........ 382/276; 382/113; 382/173; 382/181; 382/190; 382/289

(58) Field of Classification Search ................... 382/113, 382/174, 176, 177, 190, 195, 202, 225, 276, 382/289
See application file for complete search history.

(56) References Cited

U.S. PATENT DOCUMENTS

| 6,400,848 | B1 * | 6/2002 | Gallagher ..................... 382/254 |
| 6,873,732 | B2 * | 3/2005 | Dance .......................... 382/199 |
| 7,046,404 | B2 | 5/2006 | Cheatle et al. |
| 2001/0048483 | A1 * | 12/2001 | Steinberg et al. ............. 348/587 |
| 2008/0260256 | A1 * | 10/2008 | Zeng et al. .................... 382/195 |

FOREIGN PATENT DOCUMENTS
JP 3866600 10/2003

OTHER PUBLICATIONS
Pilu, "Extraction of illusory linear clues in perspectively skewed documents", Proceedings of IEEE CVPR, pp. 363-368, 2001.*

(Continued)

*Primary Examiner* — Brian Q Le
*Assistant Examiner* — Jose M Torres
(74) *Attorney, Agent, or Firm* — Staas & Halsey LLP

(57) ABSTRACT

This invention provides a correcting device and a correcting method for perspective transformation of document images. The correcting device comprises a horizontal vanishing point determining unit, for detecting a horizontal vanishing point of the perspective transformed document image; a vertical vanishing point determining unit, for detecting a vertical vanishing point of the perspective transformed document image; and a perspective transformation correcting and converting unit, for correcting the perspective transformed document image; wherein the horizontal vanishing point determining unit comprises a direct horizontal line segment detecting unit, an indirect horizontal line segment detecting unit and a horizontal vanishing point detecting unit, and wherein the horizontal vanishing point detecting unit detects a horizontal vanishing point in accordance with a direct horizontal line segment detected by the direct horizontal line segment detecting unit and an indirect horizontal line segment detected by the indirect horizontal line segment detecting unit.

18 Claims, 11 Drawing Sheets

OTHER PUBLICATIONS

Lu et al., "Perspective rectification of document images using fuzzy set and morphological operations", Image and Vision Computing, vol. 23 No. 5, pp. 541-553, 2005.*

Monnier et al., "Sequential Correction of Perspective Warp in Camera-based Documents", Proceedings of IEEE Conference on Document Analysis and Recognition, vol. 1, pp. 394-398, 2005.*

Clark et al., "Rectifying perspective views of text in 3D scenes using vanishing points", Pattern Recognition, vol. 36 No. 11, pp. 2673-2686, 2003.*

Trinh et al., "Image-based Structural Analysis of Building using Line Segments and their Geometrical Vanishing Points", IEEE International Joint Conference SICE-ICASE, Feb. 26, 2007.*

Paul Clark et al. "Rectifying perspective views of text in 3D scenes using vanishing points", The Journal of the Pattern Recognition Society, Oct. 2003, pp. 2673-2686.

Yi-Chao Ma et al. "An Integrated Approach for Perspective Distortion Correction of Small-Square Document Images", PR & AI, vol. 19 No. 4, Aug. 2006, pp. 503-508.

Maurizio Pilu "Extraction of illusory linear clues in perspectively skewed documents", Hewlett-Packard Laboratories.

Shijian Lu et al. "Perspective rectification of document images using fuzzy set and morphological operations" Image and Vision Computing vol. 23, 2005, pp. 541-553.

Shijian Lu et al. "Document Image Rectification Using Fuzzy Sets and Morphological Operators", 2004 International Conference on Image Processing (ICIP), pp. 2877-2880.

* cited by examiner

```
int x, y, s, e, k, l;
for (y = 0; y < height; y ++)
{
    for (x = 0; x < width-1; x++)
    {
        if (image(x,y) == 1 && image(x+1,y) == 0 )
        {
            s = x;
            for (k = s+1; k < width; k ++)
            {
                if ( image(k,y) == 1 )
                {
                    e = k;
                    if (e-s+1 < smear_thres)
                    {
                        for (l = s+1; l < e; l ++)
                        {
                            image(l,y) = 0;
                        }
                        x = k;
                        break;
                    }
                }
            }
        }
    }
}
```

・薄い境界罫線の脱落について
　e 文書帳票の一部(学習研究社.bmp
学研帳票の例では、境界罫線は薄い

脱落原因1：罫線領域を限定する
脱落原因2：境界のコントラス

第2原因に対応するため、濃…

CORRECTING DEVICE AND METHOD FOR PERSPECTIVE TRANSFORMED DOCUMENT IMAGES

BACKGROUND OF THE INVENTION

1. Field of the Invention

The present invention relates to a correcting device and a correcting method for perspective transformation of document images, and more particularly, to a hybrid method combining the detection of vanishing points (including horizontal vanishing points and vertical vanishing points) by voting of various line segments and the detection of vanishing points by using image projection analysis, a method for searching vertical vanishing points by clustering based on vertical strokes of characters, and a method for correcting perspective transformation based on text knowledge.

2. Description of the Related Art

Perspective transformation correction of document images based on a digital camera is an important step in document analysis and recognition. The meaning of a perspective transformation correction operation is to convert images having perspective transformation into images without perspective transformation.

The principle of various perspective transformation corrections of document images may be referred to the article in Pattern Recognition 36(11), 2003, "Rectifying perspective views of text in 3D scenes using vanishing points" by P. Clark, M. Mirmehdi, the article in the international conference of IEEE Conference on Computer Vision and Patten Recognition 2001, "Extract of illusory linear clues in perspectively skewed documents" by M. Pilu, and the article in Image and Vision Computing 23(5), 2005, "Perspective rectification of document images using fuzzy set and morphological operations" by S. J. Lu, B. M. Chen, and C. C. Ko. Moreover, there have also been patents published specifically for correcting methods of document image perspective transformation, like U.S. Pat. No. 6,873,732, C. R. Dance, "Method and apparatus for resolving perspective distortion in a document image and for calculating line sums in images", and 7,046,404, S. P. Cheatle, D. A. Grosvenor, "Document imaging system", as well as Japanese Patent P2002-89496, 岩田達明,石谷康人, "Image processing apparatus and image processing method". Perspective transformation correction of document images is usually performed on the basis of detection of the vanishing points, which includes detection of horizontal vanishing points and detection of vertical vanishing points Vanishing points detecting methods applied to image documents can be divided into two general classes. One directly uses image pixels projection analysis from a perspective view, and is referred to as the direct methods. This kind of methods involves high computational complexity and the speed of this kind of methods is very low. The other uses the analysis and voting of the line segments and their intersections indirectly, and is referred to as the indirect methods. This kind of methods has a high speed but is unstable for the processing performance.

Generally speaking, image documents captured with digital cameras, pickup lenses and they always have perspective transformation that would influence subsequent document analysis and recognition. Various algorithms for correcting perspective transformation of image documents have been proposed to correct these perspective transformations. These algorithms have effects to some extents. However, due to the different models of the digital cameras and pickup lenses as well as the different angles during the shooting, in particular with regard to document images captured with a pickup lens of a mobile phone, the circumstances of perspective transformations are diversified and complicated, to which no better solution has been obtained so far through the currently available correcting algorithms.

SUMMARY OF THE INVENTION

The present invention is made in view of the aforementioned defects and limiting of the prior art. The present invention proposes a correcting device and a correcting method for perspective transformations based on text knowledge.

According to one aspect of the present invention, it is provided a correcting device for a perspective transformed document image. The correcting device comprises a horizontal vanishing point determining unit, for detecting a horizontal vanishing point of the perspective transformed document image; a vertical vanishing point determining unit, for detecting a vertical vanishing point of the perspective transformed document image; and a perspective transformation correcting and converting unit, for correcting the perspective transformed document image; wherein the horizontal vanishing point determining unit comprises a direct horizontal line segment detecting unit, an indirect horizontal line segment detecting unit and a horizontal vanishing point detecting unit, and wherein the horizontal vanishing point detecting unit detects a horizontal vanishing point in accordance with a direct horizontal line segment detected by the direct horizontal line segment detecting unit and an indirect horizontal line segment detected by the indirect horizontal line segment detecting unit.

According to another aspect of the present invention, it is provided a correcting device for a perspective transformed document image. The correcting device comprises a horizontal vanishing point determining unit, for detecting a horizontal vanishing point of the perspective transformed document image; a vertical vanishing point determining unit, for detecting a vertical vanishing point of the perspective transformed document image; and a perspective transformation correcting and converting unit, for correcting the perspective transformed document image; wherein the vertical vanishing point determining unit comprises a direct vertical line segment detecting unit, an indirect vertical line segment detecting unit and a vertical vanishing point detecting unit, and wherein the vertical vanishing point detecting unit detects a vertical vanishing point in accordance with a direct vertical line segment detected by the direct vertical line segment detecting unit and an indirect vertical line segment detected by the indirect vertical line segment detecting unit.

According to yet another aspect of the present invention, it is provided a correcting method for a perspective transformed document image. The correcting method comprises a horizontal vanishing point determining step, for detecting a horizontal vanishing point of the perspective transformed document image; a vertical vanishing point determining step, for detecting a vertical vanishing point of the perspective transformed document image; and a perspective transformation correcting and converting step, for correcting the perspective transformed document image; wherein the horizontal vanishing point determining step comprises a direct horizontal line segment detecting step, an indirect horizontal line segment detecting step and a horizontal vanishing point detecting step, and wherein the horizontal vanishing point detecting step detects a horizontal vanishing point in accordance with a direct horizontal line segment detected by the direct horizontal line segment detecting step and an indirect horizontal line segment detected by the indirect horizontal line segment detecting step.

According to still another aspect of the present invention, it is provided a correcting method for a perspective transformed document image. The correcting method comprises a horizontal vanishing point determining step, for detecting a horizontal vanishing point of the perspective transformed document image; a vertical vanishing point determining step, for detecting a vertical vanishing point of the perspective transformed document image; and a perspective transformation correcting and converting step, for correcting the perspective transformed document image; wherein the vertical vanishing point determining step comprises a direct vertical line segment detecting step, an indirect vertical line segment detecting step and a vertical vanishing point detecting step, and wherein the vertical vanishing point detecting step detects a vertical vanishing point in accordance with a direct vertical line segment detected by the direct vertical line segment detecting step and an indirect vertical line segment detected by the indirect vertical line segment detecting step.

The methods according to the present invention remove the problem of high computational complexity of the direct methods, and overcome at the same time the defect of instability of the indirect methods. The correcting method for perspective transformed documents based on a synthesized vanishing points detecting method is a fast and robust correcting method for a perspective transformed document image.

BRIEF DESCRIPTION OF THE DRAWINGS

The accompanying drawings included herein provide further understanding to the present invention, and they are incorporated into the Description and constitute a part thereof. The drawings describe the embodiments according to this invention, and explain the principle of this invention together with the Description.

FIG. 3 shows a simple and quick Smearing algorithm;

DETAILED DESCRIPTION OF THE PREFERRED EMBODIMENTS

The correcting device and method for perspective transformed document image according to this invention are explained in detail below with reference to the accompanying drawings.

Figure 1:
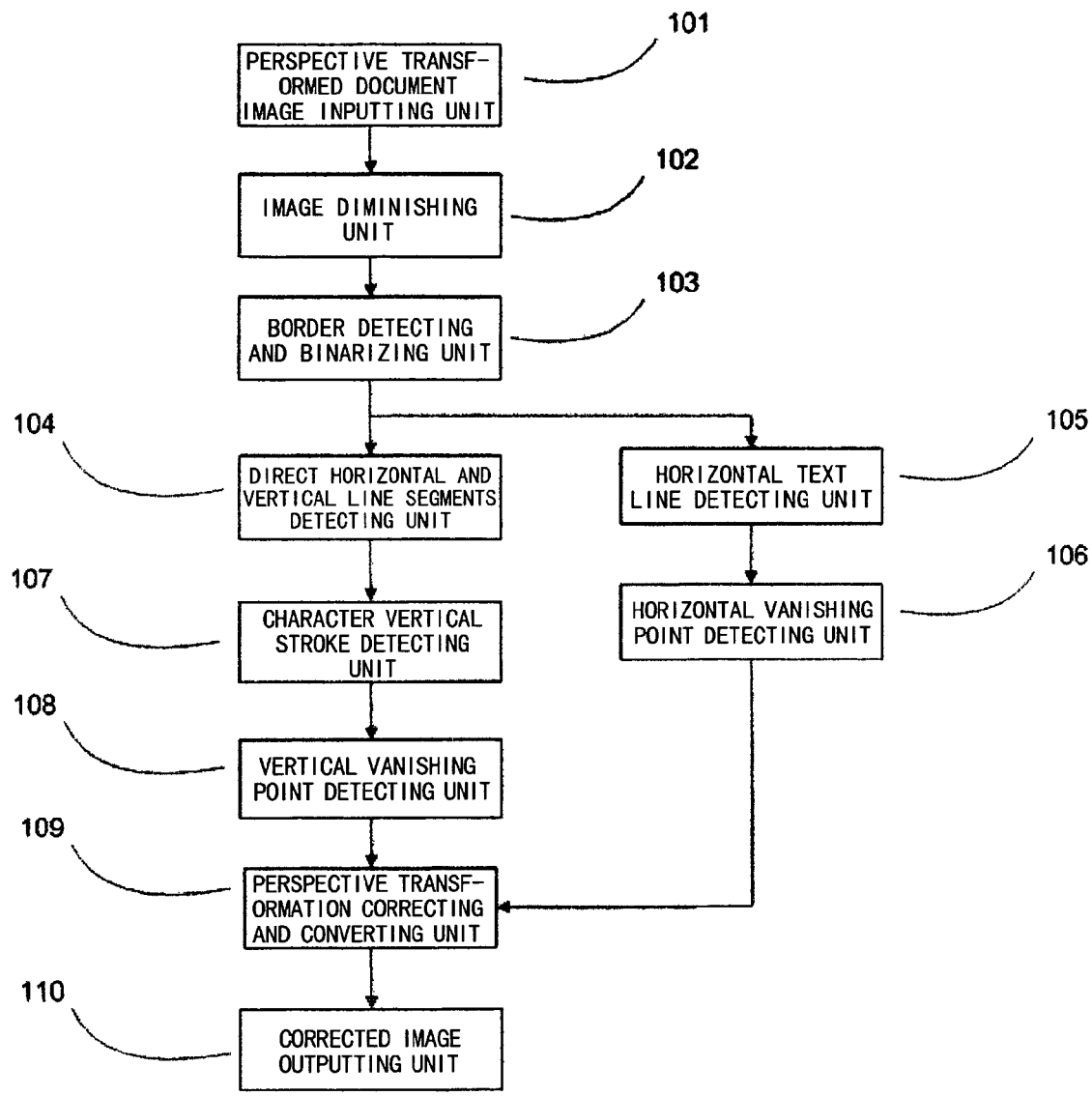
FIG. 1 is a structural diagram showing the correcting device for a perspective transformed document image according to this invention.

FIG. 1 is a structural diagram showing the correcting device for a perspective transformed document image according to one embodiment of this invention. As shown in FIG. 1, the correcting device for a perspective transformed document image according to this invention comprises a perspective transformed document image inputting unit 101, an image diminishing unit 102, a border detecting and binarizing unit 103, a direct horizontal and vertical line segment detecting unit 104 (corresponding to the direct horizontal line segment detecting unit and the direct vertical line segment detecting unit according to this invention), a horizontal text line detecting unit 105, a horizontal vanishing point detecting unit 106, a character vertical stroke detecting unit 107, a vertical vanishing point detecting unit 108, a perspective transformation correcting and converting unit 109, and a corrected image outputting unit 110.

Figure 2:
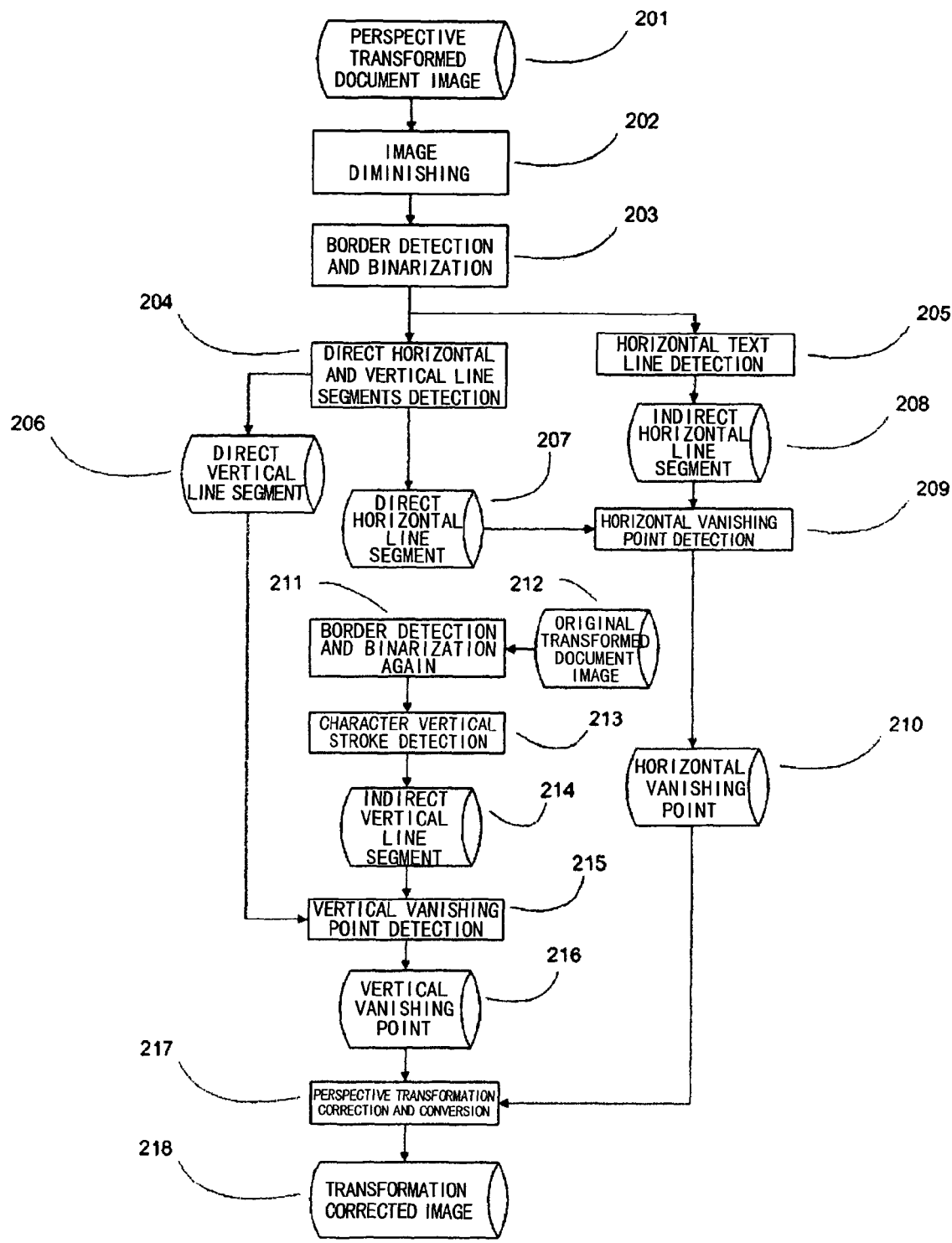
FIG. 2 is a flowchart showing the correcting method for a perspective transformed document image according to this invention.

FIG. 2 is a flowchart showing the correcting method for a perspective transformed document image according to this invention. As shown in FIG. 2, first, a perspective transformed document image is inputted by the perspective transformed document image inputting unit 101 (step 201) in the correcting device for a perspective transformed document image according to an embodiment of this invention. The document image can be derived from a digital camera, a mobile phone equipped with a pickup lens, or other photographing devices. According to one embodiment of the invention, the inputted document image is inputted into the image diminishing unit 102, which performs grayscale and diminishing operations on the image (step 202) to enhance the processing speed of the system. Having been performed with the grayscale and diminishing operations in the image diminishing unit 102, the image is inputted into the border detecting and binarizing unit 103. Of course, the image can be directly inputted into the border detecting and binarizing unit 103 without passing through the image diminishing unit 102.

The border detecting and binarizing unit 103 calculates to obtain the border image of the grayscale image, and converts the grayscale image into a binarized image (steps 203 and 211). The border detecting and binarizing unit 103 may employ various conventional image bordering algorithms and binarizing algorithms, such as the effective Canny bordering algorithm and the high-speed Otsu binarizing algorithm. The document images and perspective transformed document images in the present invention may be document images inputted externally (for instance via a digital camera, a mobile phone equipped with a pickup lens or other photographing devices), or documents images having been processed by the border detecting and binarizing unit according to the context.

In step 204, the direct horizontal and vertical line segment detecting unit 104 detects to obtain a long horizontal line segment (referred to as a direct horizontal line segment 207) and a long vertical line segment (referred to as a direct vertical line segment 206) by performing connected components analysis on the border image. In the direct horizontal and vertical line segment detecting unit 104, if the long axis direction of a connected component is adjacent to the horizontal direction, the length of the long axis is greater than a threshold value and the length of the short axis is less than another threshold value, then the long axis of this connected component is a long horizontal line segment. By the same token, if the long axis direction of a connected component is adjacent to the vertical direction, the length of the long axis is greater than a threshold value and the length of the short axis is less than another threshold value, then the long axis of this connected component is a long vertical line segment.

It should be noted however, although detections of the direct horizontal line segment and the direct vertical line segment are both performed by the direct horizontal and vertical line segment detecting unit 104, there can also be two individual units, one performing detection of the direct horizontal line segment and the another performing detection of the direct vertical line segment.

Meanwhile, in step 205, the horizontal text line detecting unit 105 detects the horizontal text lines in the border image, and obtains a corresponding horizontal line segment (referred to as an indirect horizontal line segment 208) from these text lines. According to one embodiment, the horizontal text line detecting unit 105 detects the horizontal text lines by means of a simple and quick Smearing algorithm, for example, as shown in FIG. 3.

In step 209, the horizontal vanishing point detecting unit 106 detects the vanishing points and obtains the final horizontal vanishing point 210 on the basis of the direct horizontal line segment 207 and the indirect horizontal line segment 208 and in combination with a direct method based on image projection analysis and an indirect method based on the analysis and voting of the horizontal line segments and the intersection thereof. This will be described in greater detail in the following paragraphs.

Meanwhile, in step 213, the character vertical stroke detecting unit 107 performs character vertical stroke detection on the border image obtained by the border detecting and binarizing unit 103 in step 211, to obtain an indirect vertical line segment 214. As should be noted here, the unit 107 is employed to obtain the indirect vertical line segment 214, while in other embodiments of the invention, this unit can employ other methods such as those disclosed in the prior art. Even under such a circumstance, since the present invention makes use of the synthesized method that combines the direct method and the indirect method, the object of the invention can still be achieved. In the circumstance as shown in FIG. 2, step 211 differs from step 203 in the fact that the image in step 211 has not been diminished. The transformed document image 212 is identical with the transformed document image 201.

According to one embodiment of this invention, in step 213, the character vertical stroke detecting unit 107 obtains the vertical strokes of the characters by performing connected components analysis on the border image, so as to obtain a line segment having vertical direction indication (namely the indirect vertical line segment 214).

Subsequently in step 215, the vertical vanishing point detecting unit 108 detects vanishing points and obtains the final vertical vanishing point (namely the vertical vanishing point 216) on the basis of the direct vertical line segment 206 and the indirect vertical line segment 214 and in combination with a direct method based on image projection analysis and an indirect method based on the analysis and voting of the vertical line segments and the intersection thereof.

In the present invention, the direct horizontal and vertical line segment detecting unit 104 (which detects a portion of the direct horizontal line segments), the horizontal text line detecting unit 105 and the horizontal vanishing point detecting unit 106 correspond to the horizontal vanishing point determining unit, while the direct horizontal and vertical line segment detecting unit 104 (which detects a portion of the direct vertical line segments), the character vertical stroke detecting unit 107 and the vertical vanishing point detecting unit 108 correspond to the vertical vanishing point determining unit.

Subsequently in step 217, the perspective transformation correcting and converting unit 109 obtains a conversion matrix of the perspective transformation by means of the horizontal vanishing point and the vertical vanishing point, and obtains the final corrected document image (namely a transformation corrected image 218) by performing a correction and conversion processing based on text knowledge, and the final corrected document image is outputted by the outputting unit 110.

FIG. 3 shows a simple and quick Smearing algorithm (represented by C Language) used by the horizontal text line detecting unit 105 in step 205 as shown in FIG. 2. In FIG. 3, 'height' represents the height of a banarized image to be processed, 'width' represents the width thereof, and image(x, y)=1 represents a black point pixel at the image coordinates (x,y). This quick algorithm horizontally scans each line of images. In each line, if the distance between two adjacent black pixel points is less than a certain threshold value (smear_thres), the pixel points between these two points are all assigned to be black pixel points.

Figure 4:
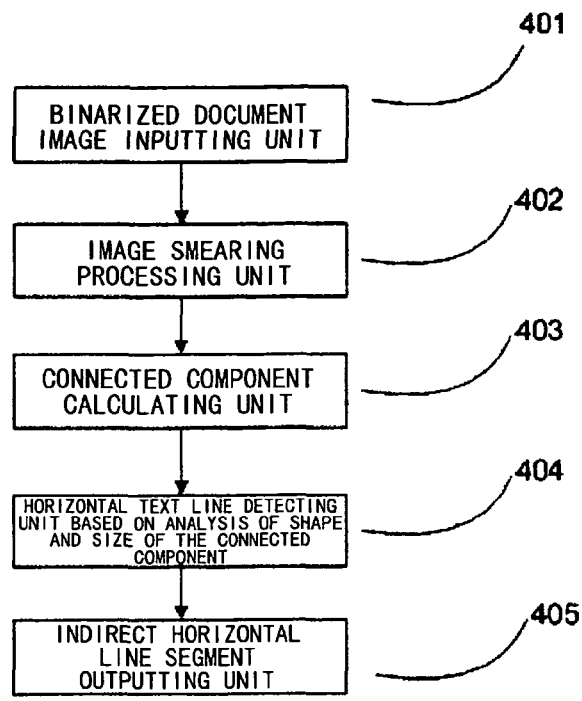
FIG. 4 is a structural diagram showing a horizontal text line detecting unit.

FIG. 4 is a structural diagram showing the horizontal text line detecting unit 105. As shown in FIG. 4, according to one embodiment of this invention, the horizontal text line detecting unit 105 includes a binarized document image inputting unit 401, an image Smearing processing unit 402, a connected component calculating unit 403, a horizontal text line detecting unit 404 based on analysis of the shape and size of the connected component, and an indirect horizontal line segment outputting unit 405

Figure 5:
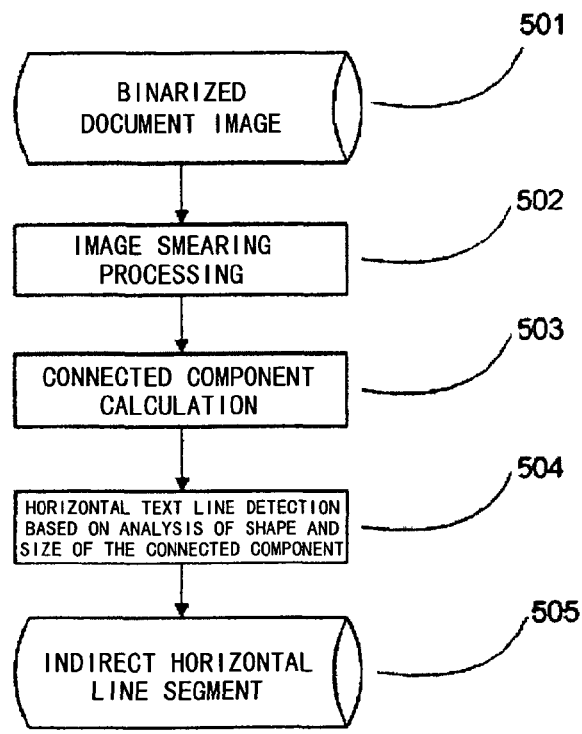
FIG. 5 is a flowchart showing a horizontal text line detecting process.
Figure 7:
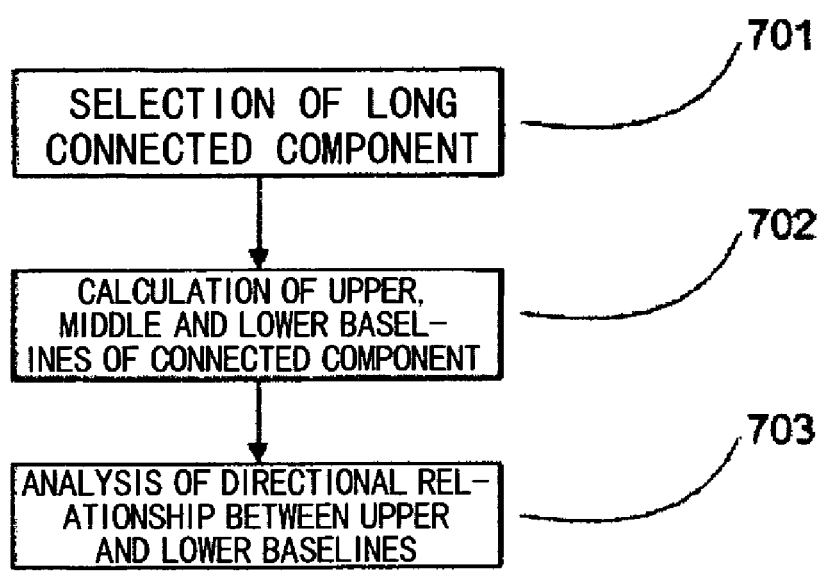
FIG. 7 is a flowchart showing horizontal text line detection based on shape and size analysis of connected components.

FIG. 5 is an operational flowchart of the horizontal text line detecting unit 105. First in step 501, a binarized image having been performed with border detection and binarization by the border detecting and binarizing unit 103 is inputted by the inputting unit 401. Subsequently in step 502, the image Smearing processing unit 402 performs Smearing processing by means of the simple and quick Smearing algorithm, for example, as shown in FIG. 3. The Smearing algorithm scans, in the horizontal direction, the image, and analyzes the relationship between the black point pixels in the horizontal direction: if the distance between two black point pixels in the horizontal direction is less than a predetermined threshold value, the pixels between these two points all become black point pixels. Then in step 503, the connected component calculating unit 403 calculates the connected component processed by the Smearing by analysing the interrelationship between the black point pixels. Subsequently in step 504, the horizontal text line detecting unit 404 based on analysis of the shape and size of the connected component detects the horizontal text lines by analyzing the size, shape and direction of the connected components, and the specific procedures thereof are as shown in FIG. 7. In step 505, the indirect horizontal line segment outputting unit 405 outputs the obtained horizontal line segment (namely the indirect horizontal line segment 208) which represents the horizontal text lines.

Figure 6:
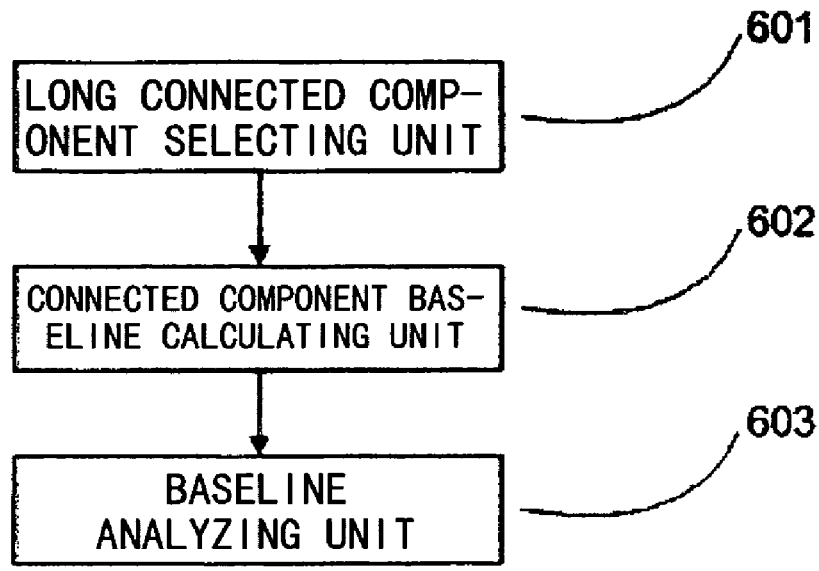
FIG. 6 is a diagram showing a horizontal text line detecting device based on shape and size analysis of connected components.

FIG. 6 is a structural diagram of the horizontal text line detecting unit 404 based on analysis of the shape and size of the connected component. As shown in FIG. 6, the horizontal text line detecting unit 404 based on analysis of the shape and size of the connected component includes a long connected component selecting unit 601, a connected component baseline calculating unit 602, and a baseline analyzing unit 603.

FIG. 7 is an operational flowchart of the horizontal text line detecting unit 404 based on analysis of the shape and size of the connected component. First in step 701, the unit 601 selects a long connected component, for instance, selects, as a candidate horizontal text line, a connected component having a relatively long length (namely the length being greater than a certain threshold value). Subsequently in step 702, the unit 602 calculates the upper, middle and lower baselines of the connected component, namely calculates the upper, middle and lower baselines with regard to the connected component of the candidate text line. The specific step is as follows: the upper and lower contour points of the connected component are first calculated, and the sequence is $\{(x_1, y_1^U), (x_2, y_2^U), \ldots, (x_N, y_N^U)\}$, $\{(x_1, y_1^L), (x_2, y_1^L), \ldots, (x_N, y_N^L)\}$, where (x,y) represents the image coordinates, and N is the length of this connected component. Subsequently, the upper and lower contour points with relatively greater vertical distance (namely greater than a predetermined threshold value) of the connected component are retained, with the new sequence of the upper contour point being Set(U)=$\{(x_1, y_1^U), (x_2, y_2^U), \ldots, (x_M, y_M^U)\}$, and the new sequence of the lower contour point being Set(L)=$\{(x_1, y_1^L), (x_2, y_2^L), \ldots, (x_M, y_M^L)\}$, and the average distance between the upper and lower contour points in the vertical direction is calculated to obtain the middle contour point of the connected component, with its sequence being Set(C)=$\{(x_1, (y_1^U+y_1^L)/2), (x_2, (y_2^U+y_2^L)/2), \ldots, (x_M, (y_M^U+y_M^L)/2)\}$. Then in step 703, the unit 703 analyzes the directional relationship between the upper baseline and the lower baseline: if the upper and lower baselines of a connected component are substantially in the same direction (namely the angle therebetween being less than a predetermined threshold value), and a difference between the average height, to which all contour points in the upper and lower baselines correspond, and the height of a standard text line is less than a lesser threshold value of a certain value, it is indicated that this connected component is a horizontal text line. A line segment obtained by fitting the sequences of the contour points can be used as the direct horizontal line segment (namely the direct horizontal line segment 207) represented by this text line.

Figure 8:
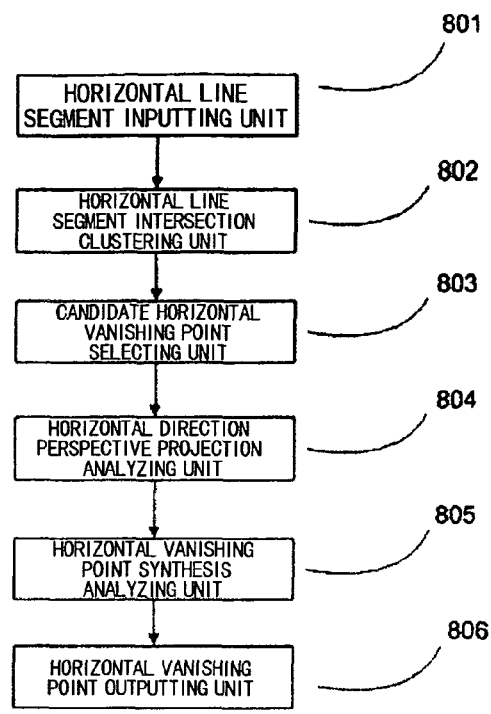
FIG. 8 is a structural diagram showing the horizontal vanishing point detecting unit.

FIG. 8 is a structural diagram of the horizontal vanishing point detecting unit 106. This unit is a synthesized device combining the direct method based on image projection analysis and the indirect method of voting of various horizontal line segments. As shown in FIG. 8, according to one embodiment of the invention, the horizontal vanishing point detecting unit 106 includes a horizontal line segment inputting unit 801, a horizontal line segment intersection clustering unit 802, a candidate horizontal vanishing point selecting unit 803, a horizontal direction perspective projection analyzing unit 804, a horizontal vanishing point synthesis analyzing unit 805, and a horizontal vanishing point outputting unit 806.

Figure 9:
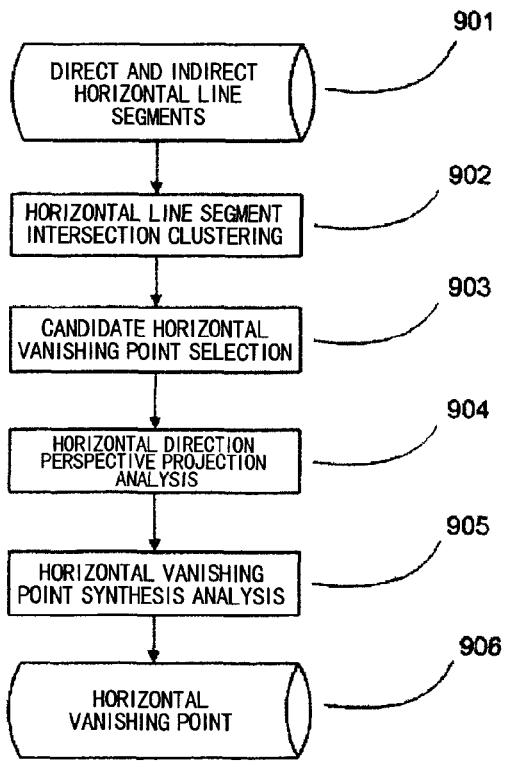
FIG. 9 is a flowchart showing horizontal vanishing point detection.
Figures 10, 11:
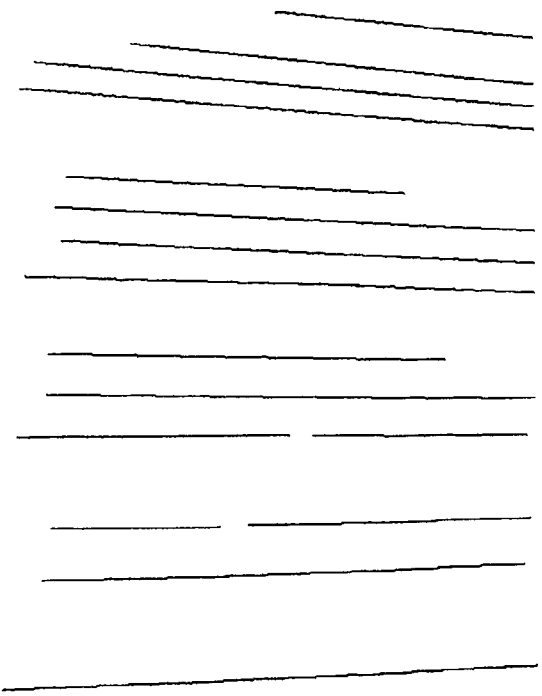
FIG. 10 is a certain perspective transformed document image.
FIG. 11 is a diagram showing various horizontal line segments of the image in FIG. 10.
Figure 12:
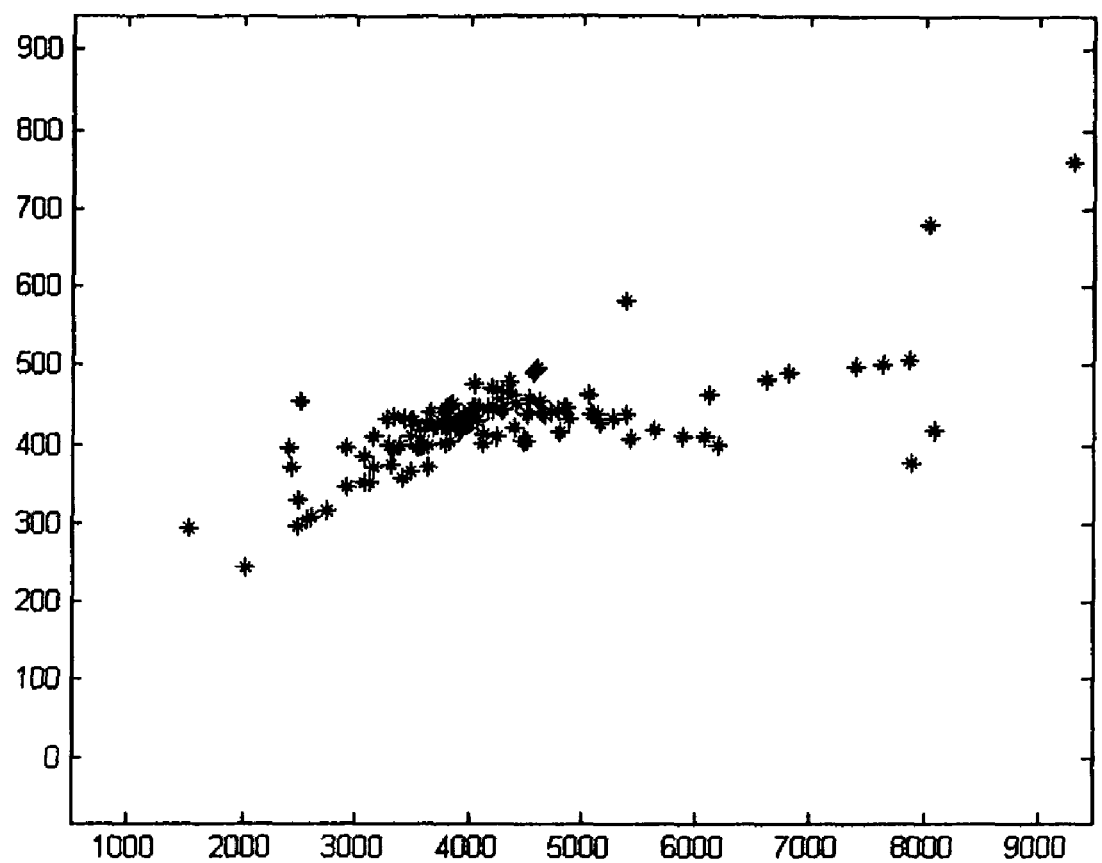
FIG. 12 is a diagram showing distribution of intersections in pairs of the horizontal line segments in FIG. 11.

FIG. 9 is an operational flowchart of the horizontal vanishing point detecting unit 106. The method is a synthesized method combining the direct method based on image projection analysis and the indirect method of voting of various horizontal line segments. As shown in FIG. 9, in step 901, the inputting unit 801 inputs the direct horizontal line segment 207 and the indirect horizontal line segment 208. Subsequently, horizontal vanishing point detection is performed by using an indirect method similar to the voting of line segments and the intersection thereof. In one embodiment in step 902, the horizontal line segment intersection clustering unit 802 clusters the point collections formed by intersections in pairs of all horizontal line segments (including the obtained direct horizontal line segment and indirect horizontal line segment) by a clustering method (such as the K-Means method) to obtain a plurality of clusters. All these intersections have such a property that they can be better clustered into a plurality of sub-collections as shown in FIGS. 10-12. FIG. 10 shows an original perspective transformed document image, FIG. 11 shows the horizontal line segments detected and obtained by a horizontal text line detecting unit 205, and FIG. 12 shows the spatial distribution of all intersections of these horizontal line segments intersecting in pairs, where the coordinate (0, 0) is the vertex at the upper left of the image, wherein an actual horizontal vanishing point (as shown by a solid circle in FIG. 12) and the surroundings thereof is a cluster. Then in step 903, the candidate horizontal vanishing point selecting unit 803 selects the central point of each cluster as a candidate horizontal vanishing point, and takes a ratio of the number of the intersections contained in this cluster to the number of all intersections as a weighting coefficient of the cluster of the candidate horizontal vanishing point. The coefficient is set as $f_h^d(k)$, where k represents the $k^{th}$ candidate horizontal vanishing point. Subsequently, a direct method similar to image projection analysis is employed to perform horizontal vanishing point detection on the aforementioned collections of the candidate horizontal vanishing points. Second, a projection method is also employed in this invention to perform analysis on the candidate horizontal vanishing points. That is to say, in step 904 the horizontal direction perspective projection analyzing unit 804 performs perspective projection analysis in the horizontal direction on the document image with regard to the horizontal vanishing points. The projection method employed by the system on each of the candidate horizontal vanishing points selected by the candidate horizontal vanishing point selecting unit 803 is the same as the method presented in the article "Rectifying perspective views of text in 3D scenes using vanishing points" by P. Clark, and M. Mirmehdi in section 3 of Pattern Recognition 36(11), 2003. The derivative-squared-sum of the projection value of each candidate horizontal vanishing point is obtained, and a ratio of the derivative-squared-sum of each candidate horizontal vanishing point to the derivative-squared-sum of all candidate points is taken as a weighting coefficient of the projection analysis of this candidate point. The coefficient is set as $f_h^i(k)$, where k represents the $k^{th}$ candidate horizontal vanishing point. Subsequently in step 905, the horizontal vanishing point synthesis analyzing unit 805 synthesizes the foregoing weighting coefficients (such as shown in the following formula):

$$f_h(k)=G(f_h^d(k),f_h^i(k))$$

These weighting coefficients can be synthesized in a linear manner (such as shown in the following formula):

$$f_h(k)=\alpha f_h^d(k)+\beta f_h^i(k)$$

$$\alpha+\beta=1$$

A simpler form, i.e. $\alpha=\beta=0.5$, may be used. Finally, the candidate horizontal vanishing point having the greatest synthesized weighting coefficient is selected as the final horizontal vanishing point, and outputted by the outputting unit 806 (step 906).

This method removes the problem of high computational complexity of the direct methods, and overcomes at the same time the defect of instable performance of the indirect methods. This synthesized method is a fast and robust method for detecting the vanishing points.

Figure 13:
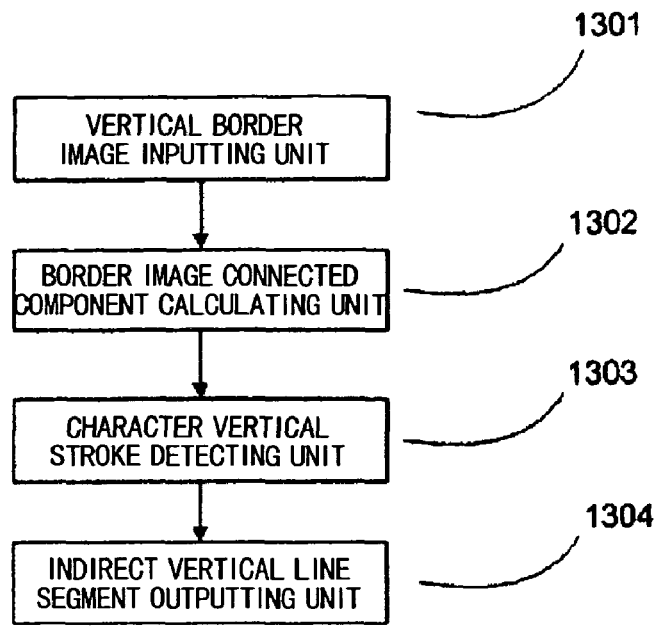
FIG. 13 is a structural diagram showing a character vertical stroke detecting unit.

FIG. 13 is a structural diagram showing the character vertical stroke detecting unit 107 according to one embodiment of the present invention. As shown in FIG. 13, the character vertical stroke detecting unit 107 includes a vertical border image inputting unit 1301, a border image connected component calculating unit 1302, a vertical stroke detecting unit 1303, and an indirect vertical line segment outputting unit 1304.

Figure 14:
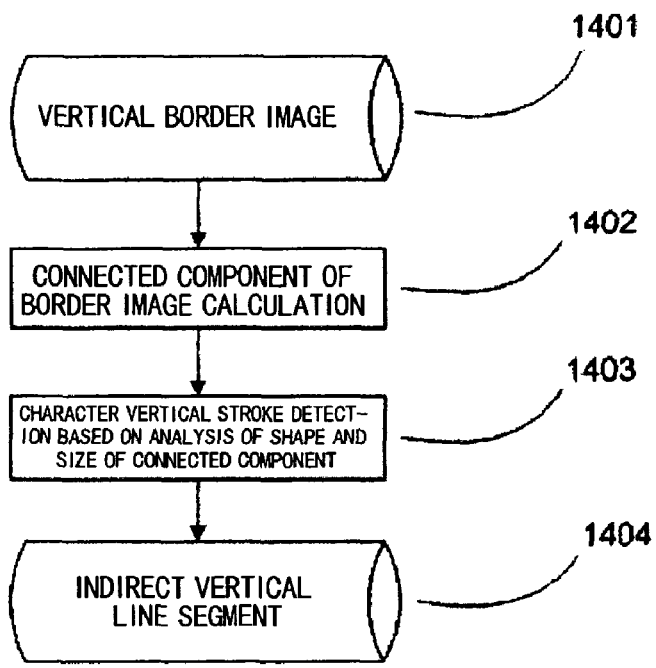
FIG. 14 is a flowchart showing character vertical stroke detection.

FIG. 14 is an operational flowchart of the character vertical stroke detecting unit 107 according to one embodiment of the present invention. First in step 1401, the inputting unit 1301 inputs a vertical border image obtained by the border detecting and binarizing unit 103. Subsequently in step 1402, the border image connected component calculating unit 1302 calculates the connected components with regard to the vertical border image. Thereafter in step 1403, the vertical stroke detecting unit 1303 analyzes the shapes and sizes of the connected components, selects a connected component having a height similar to the height of the characters and having a direction adjacent to the vertical direction as the candidate vertical stroke, and analyzes the shape of this candidate vertical stroke connected component. As should be noted here, in the present article, when the absolute value of the difference between the height of the connected component and the height of the characters is less than a predetermined threshold value, this is referred to as the height of the connected component being similar to the height of the characters. Likewise, when the absolute value of the difference between the direction of the connected component and the vertical direction is less than a predetermined threshold value, this is referred to as the direction of the connected component being adjacent to the vertical direction. The specific step is as follows: let $C_i$ be the connected component of a certain candidate vertical stroke, a line segment $LC_i$ is fitted by performing the Least-Square algorithm on all points of this connected component, and the equation of the line segment is $a_i*y+b_i*x+c=0$, then the distance between the point (x,y) on this connected component and the line segment is:

$$DIS_i(x, y) = \left| \frac{a_i \times y + b_i \times x + c}{\sqrt{a^2 + b^2}} \right|$$

Suppose $$f(LC_i) = \begin{cases} 1 & N_{LC_i} > \text{n\_thres\_stroke} \\ 0 & \text{otherwise} \end{cases}$$

where $$P_{LC_i} = N(DIS_i, \mu_{stroke}, \sigma_{stroke})$$

$$I_{LC_i}(x, y) = \begin{cases} 1 & P_{LC_i}(x, y) > \text{p\_thres\_stroke} \\ 0 & \text{otherwise} \end{cases}$$

$$N_{LC_i} = \sum_{(x,y) \in C_i} I_{LC_i}(x, y).$$

Wherein $N(x, \mu, \sigma)$ is a Gaussian distribution of the line segment LC, with the means being $\mu$, and the standard variance being $\sigma \cdot \mu_{stroke}$ and $\sigma_{stroke}$ are the average value and the standard variance relevant to the character vertical stroke obtained empirically and experimentally. p_thres_stroke is a threshold value approximately equal to 1, and can be set as 0.98. n_thres_stroke is approximately equal to the number of the black point pixels in this connected component. If $f(LC_i)$ 1, it is indicated that $C_i$ is the character vertical stroke. By this time, these line segments fitted by the connected component of the character vertical stroke are the indirect vertical line segments. In step 1404, the outputting unit 1304 performs the output.

Figure 15:
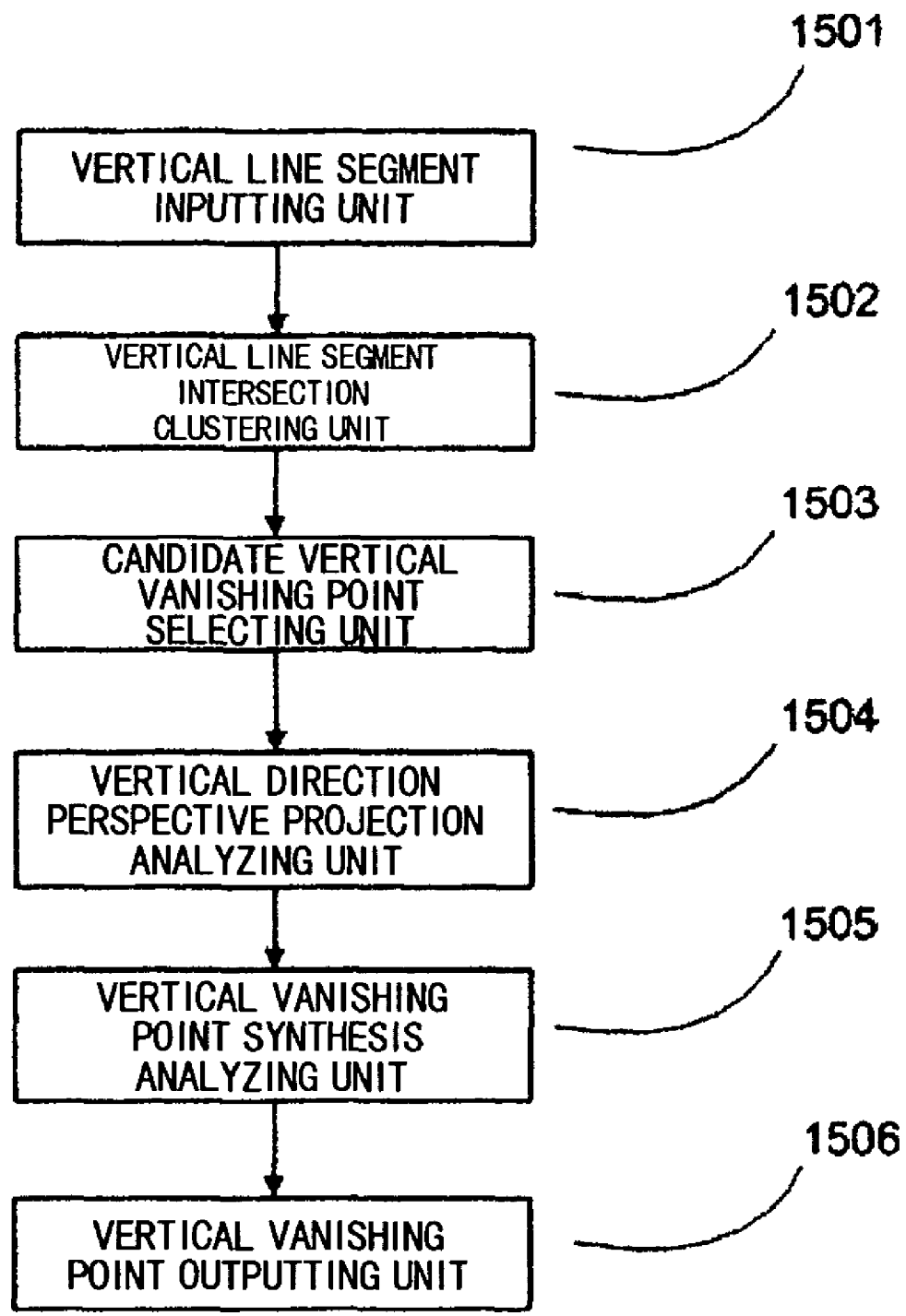
FIG. 15 is a structural diagram showing the vertical vanishing point detecting unit.

FIG. 15 is a structural diagram showing the vertical vanishing point detecting unit 108 according to one embodiment of this invention. This unit is a synthesized device combining the direct method based on image projection analysis and the indirect method of voting of various vertical line segments. As shown in FIG. 15, the vertical vanishing point detecting unit 108 according to one embodiment of this invention includes a vertical line segment inputting unit 1501, a vertical line segment intersection clustering unit 1502, a candidate vertical vanishing point selecting unit 1503, a vertical direction perspective projection analyzing unit 1504, a vertical vanishing point synthesis analyzing unit 1505, and a vertical vanishing point outputting unit 1506.

Figure 16:
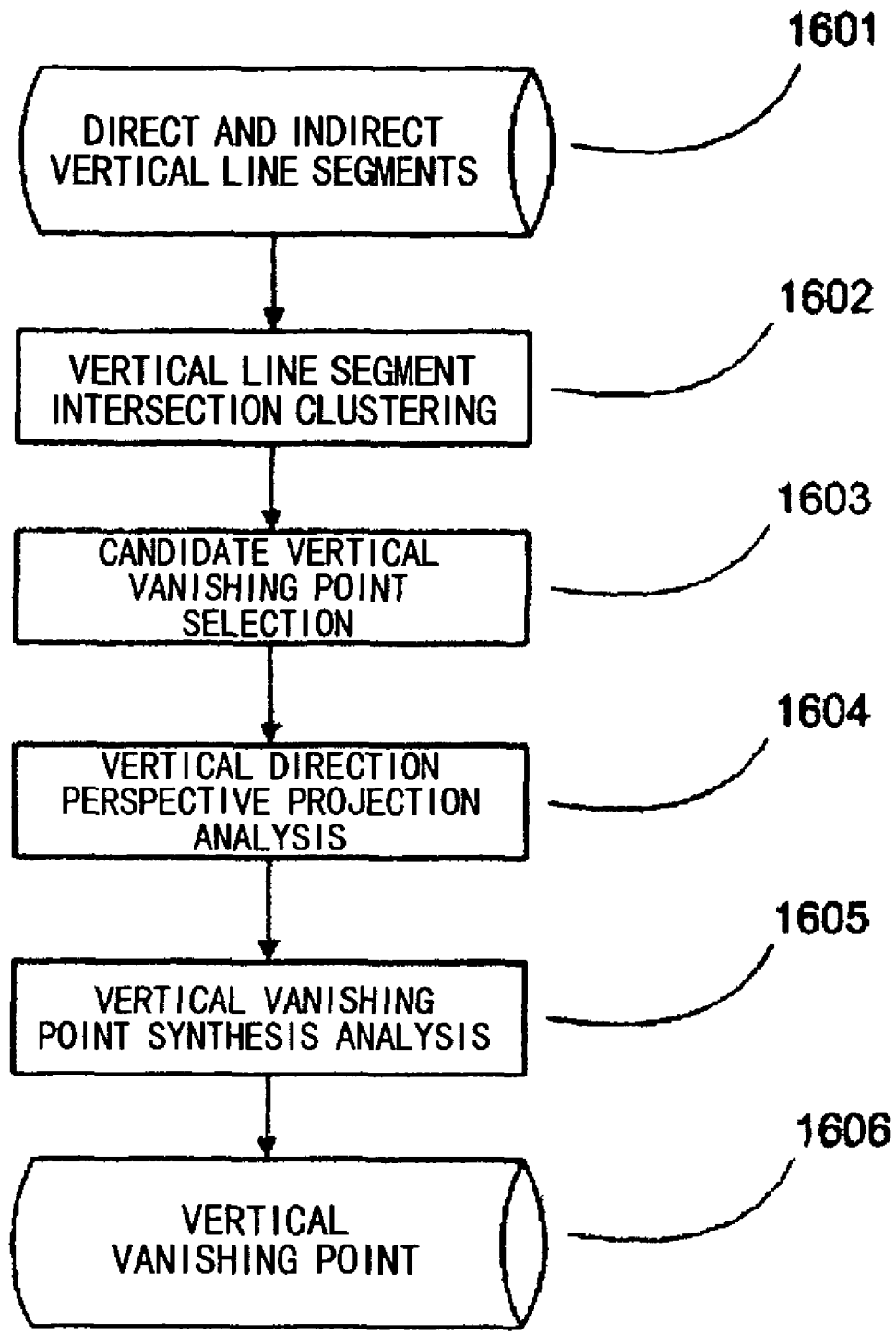
FIG. 16 is a flowchart showing vertical vanishing point detection.

FIG. 16 is a flowchart of the vertical vanishing point detecting unit 108 according to one embodiment of this invention. The method is a synthesized method combining the direct method based on image projection analysis and the indirect method of voting of various vertical line segments. As shown in FIG. 16, in step 1601, the inputting unit 1501 inputs the direct vertical line segment 206 and the indirect vertical line segment 214. Subsequently, vertical vanishing point detection is performed by using an indirect method similar to the voting of the line segments and the intersection thereof. That is to say, in step 1602, the vertical line segment intersection clustering unit 1502 clusters the point collections formed by intersections in pairs of all vertical line segments (including the obtained direct vertical line segment and indirect vertical line segment) by a clustering method (such as the K-Means method) to obtain a plurality of clusters. All these intersections have such a property that they can be better clustered into a plurality of sub-collections. In step 1603, the candidate vertical vanishing point selecting unit 1503 selects the central point of each cluster as a candidate vertical vanishing point, and takes a ratio of the number of the intersections contained in this cluster to the number of all intersections as a weighting coefficient of the cluster of the candidate vertical vanishing point. The coefficient is set as $f_v^d(k)$, where k represents the $k^{th}$ candidate vertical vanishing point. Subsequently, a direct method similar to image projection analysis is employed to perform candidate vanishing point detection on the aforementioned collections of the candidate vertical vanishing points. In step 1604, the vertical direction perspective projection analyzing unit 1504 performs perspective projection analysis in the vertical direction. The projection method employed by the system on each of the candidate vertical vanishing points obtained by the selecting unit 1503 is similar to the method presented in the article "Rectifying perspective views of text in 3D scenes using vanishing points" by P. Clark, and M. Mirmehdi in section 3 of Pattern Recognition 36(11), 2003. However, the projection is not directed to the whole image, but directed to each line of the horizontal text lines (the horizontal text lines here indicate the documents row-by-row in the document image, and can be obtained by the previously mentioned horizontal document line detecting unit). The specific operation is as follows: suppose $B_i^n(k)$ is the value of the $i^{th}$ bin of the nth line of the horizontal text lines with regard to the $k^{th}$ candidate vertical vanishing point in the aforementioned projection procedure, and $B_i^n(k)=0$ indicates that this corresponds to a blank column in the vertical direction in the text line; while $(B_i^n(k)=0)=1$ indicates that $B_i^n(k)=0$, and otherwise indicates that $B_i^n(k) \neq 0$. Consequently in the projection procedure, the number of blank columns of all horizontal text lines to which the $k^{th}$ candidate vertical vanishing point corresponds is:

$$g(k) = \sum_{n=1}^{N} \sum_{i=1}^{l} (B_i^n(k) == 0)$$

where N is the number of the text lines, and l is the number of bin.

The text lines here are obtained by the horizontal text line detecting unit 105.

By the aforementioned operation, the number of the blank columns to which each of the candidate vertical vanishing points corresponds is obtained, and a ratio of the number of the blank columns of each of the candidate vertical vanishing points to the number of the accumulated blank columns of all candidate points is taken as a weighting coefficient of the projection of the candidate point. The coefficient is set as $f_v^i(k)=g(k)$, where k represents the $k^{th}$ candidate vertical vanishing point. Then in step 160S, the vertical vanishing point synthesis analyzing unit 1505 synthesizes the foregoing weighting coefficients (such as shown in the following formula):

$$f_v(k)=G(f_v^d(k),f_v^i(k))$$

These weighting coefficients can be synthesized in a linear manner (such as shown in the following formula):

$$f_v(k)=\alpha f_v^d(k)+\beta f_v^i(k)$$

$$\alpha+\beta=1$$

A simpler form, i.e. .alpha.=.beta.=0.5, may be used. Finally, the candidate vertical vanishing point having the greatest synthesized weighting coefficient is selected as the final vertical vanishing point, and the vertical vanishing point is outputted by the outputting unit 1506 in step 1606.

Once the horizontal vanishing point and the vertical vanishing point are obtained, it is possible to conveniently calculate a conversion matrix from the original perspective transformed document image to the corrected image; suppose the conversion matrix be M, the conversion procedure is as follows:

$$\begin{bmatrix} x_d \\ y_d \\ 1 \end{bmatrix} = M \begin{bmatrix} x_u \\ y_u \\ 1 \end{bmatrix}$$

where $(x_d, y_d)$ represents the coordinates of the original image (the perspective transformed document image unit 201), and $(x_u, y_u)$ represents the coordinates of the corrected image. Provided a point (i, j) on the corrected image, where both i and j are integers, a set of coordinates (fi, fj) is obtained through the aforementioned conversion procedure, where both fi and fj are of floating point number. In order to enhance the quality of the corrected image, the common processing method is performed by using interpolation. In order to increase the conversion speed, a perspective transformation correcting and converting unit 117 only converts the region having text of the transformed image, whereas other regions are replaced with adjacent points. Text regions are obtained through text detection, and correction and conversion are performed on these text regions based on interpolation (such as linear interpolation) while other regions are replaced directly with adjacent points. Let:

$$i0=int(fi)$$

$$i0=int(fj)$$

If there is a text point of the (i0, j0) on the original transformed image (the perspective transformed document image unit 201), represented by mask(i0, j0)=1, the interpolation processing is employed; otherwise:

$$image\_dst(ij)=image\_src(i0j0)$$

That is to say, the adjacent points (i0, j0) of the original image are used to represent the corresponding points (ij) on the corrected image, where image src represents the original image, and image_dst represents the corrected image.

The text region here is obtained by the horizontal text line detecting unit 205.

When all the above steps are completed, the result outputted by the system is an image whose transformation has been corrected.

In comparison with a conventional method that detects the vertical vanishing points based on analysis of the vertical distances between various vertical long line segments and horizontal line segments, the present invention proposes a method that searches the vertical vanishing points based on clustering the vertical strokes of characters, detects the vertical strokes of characters through connected component analysis of the shapes and sizes of the character strokes, and clusters the intersections of all the vertical strokes in pairs to obtain a plurality of clusters, the center of each of which is a candidate vertical vanishing point. This method has stronger robustness than the method utilizing analysis of the vertical distance between horizontal line segments or vertical line segments to detect the vertical vanishing points.

In comparison with a conventional method that performs pixel interpolation and correcting conversion processing on all pixel points in the image to be processed, the perspective transformation correcting and converting method based on text knowledge as proposed in the present invention performs conversion based on interpolation processing merely on the region having text of the transformed image. This method enhances the speed of the whole device and the method.

The vanishing point detection in the method uses a synthesized method that combines the direct method based on image projection analysis and the indirect method for detecting vanishing points by voting of various line segments, makes use of various segments to perform voting and clustering to obtain a plurality of candidate points of the vanishing points, performs image projection analysis on these candidate points, combines the results of the foregoing two steps to obtain the final vanishing points (including the horizontal vanishing points and the vertical vanishing points), and performs corresponding perspective transformation correction. In addition, the method clusters the vertical strokes of characters to search the vertical vanishing points, detects reliable vertical strokes of characters by using rule-based connected component analysis, and clusters the intersections of these vertical strokes to obtain a plurality of candidate points of the vertical vanishing points. Finally, the method performs perspective transformation correction and conversion based on text knowledge, obtains a transformation correction and conversion matrix from the horizontal vanishing points and the vertical vanishing points, merely converts the region having text of the transformed image, and replaces other regions with adjacent points. The present invention is applicable for document images shot by a digital camera, by a mobile phone with a pickup lens, and by other photographing devices.

In summary, according to one aspect of the present invention, it is provided a correcting device for a perspective transformed document image. The correcting device comprises a horizontal vanishing point determining unit, for detecting a horizontal vanishing point of the perspective transformed document image; a vertical vanishing point determining unit, for detecting a vertical vanishing point of the perspective transformed document image; and a perspective transformation correcting and converting unit, for correcting the perspective transformed document image; wherein the horizontal vanishing point determining unit comprises a direct horizontal line segment detecting unit, an indirect horizontal line segment detecting unit and a horizontal vanishing point detecting unit, and wherein the horizontal vanishing point detecting unit detects a horizontal vanishing point in accordance with a direct horizontal line segment detected by the direct horizontal line segment detecting unit and an indirect horizontal line segment detected by the indirect horizontal line segment detecting unit.

According to another aspect of the present invention, it is provided a correcting device for a perspective transformed document image. The correcting device comprises a horizontal vanishing point determining unit, for detecting a horizontal vanishing point of the perspective transformed document image; a vertical vanishing point determining unit, for detecting a vertical vanishing point of the perspective transformed document image; and a perspective transformation correcting and converting unit, for correcting the perspective transformed document image; wherein the vertical vanishing point determining unit comprises a direct vertical line segment detecting unit, an indirect vertical line segment detecting unit and a vertical vanishing point detecting unit, and wherein the vertical vanishing point detecting unit detects a vertical vanishing point in accordance with a direct vertical line segment detected by the direct vertical line segment detecting unit and an indirect vertical line segment detected by the indirect vertical line segment detecting unit.

According to yet another aspect of the present invention, it is provided a correcting method for a perspective transformed document image. The correcting method comprises a horizontal vanishing point determining step, for detecting a horizontal vanishing point of the perspective transformed document image; a vertical vanishing point determining step, for detecting a vertical vanishing point of the perspective transformed document image; and a perspective transformation correcting and converting step, for correcting the perspective transformed document image; wherein the horizontal vanishing point determining step comprises a direct horizontal line segment detecting step, an indirect horizontal line segment detecting step and a horizontal vanishing point detecting step, and wherein the horizontal vanishing point detecting step detects a horizontal vanishing point in accordance with a direct horizontal line segment detected by the direct horizontal line segment detecting step and an indirect horizontal line segment detected by the indirect horizontal line segment detecting step.

According to still another aspect of the present invention, it is provided a correcting method for a perspective transformed document image. The correcting method comprises a horizontal vanishing point determining step, for detecting a horizontal vanishing point of the perspective transformed document image; a vertical vanishing point determining step, for detecting a vertical vanishing point of the perspective transformed document image; and a perspective transformation correcting and converting step, for correcting the perspective transformed document image; wherein the vertical vanishing point determining step comprises a direct vertical line segment detecting step, an indirect vertical line segment detecting step and a vertical vanishing point detecting step, and wherein the vertical vanishing point detecting step detects a vertical vanishing point in accordance with a direct vertical line segment detected by the direct vertical line segment detecting step and an indirect vertical line segment detected by the indirect vertical line segment detecting step.

According to one embodiment of the present invention, the horizontal line segment intersection clustering unit makes use of the K-Means method to perform the clustering.

According to one embodiment of the present invention, the horizontal vanishing point detecting unit includes a horizontal line segment intersection clustering unit that clusters the point collections formed by intersections in pairs of all horizontal line segments to obtain a plurality of clusters; a candidate horizontal vanishing point selecting unit that selects the central point of each cluster as a candidate horizontal vanishing point, and obtains a weighting coefficient of each candidate horizontal vanishing point; a horizontal direction perspective projection analyzing unit that performs perspective projection analysis in the horizontal direction on the document image with regard to the candidate horizontal vanishing points, and obtains another weighting coefficient of each candidate horizontal vanishing point; and a horizontal vanishing point synthesis analyzing unit that selects the final horizontal vanishing point based on the weighting coefficient and the another weighting coefficient.

According to one embodiment of the present invention, the horizontal vanishing point synthesis analyzing unit synthesizes the weighting coefficient obtained by the horizontal direction perspective projection analyzing unit and the weighting coefficient obtained by the candidate horizontal vanishing point selecting unit in a linear mode.

According to one embodiment of the present invention, the vertical vanishing point determining unit comprises a direct vertical line segment detecting unit, an indirect vertical line segment detecting unit and a vertical vanishing point detecting unit, and wherein the vertical vanishing point detecting unit detects a vertical vanishing point in accordance with a direct vertical line segment detected by the direct vertical line segment detecting unit and an indirect vertical line segment detected by the indirect vertical line segment detecting unit.

According to one embodiment of the present invention, the indirect vertical line segment detecting unit includes a connected component calculating unit that calculates a connected component of the document image; and a character vertical stroke detecting unit that analyzes the shape and size of the connected component to determine a candidate vertical stroke, and analyzes the shape of the connected component of the candidate vertical stroke to obtain a vertical line segment.

According to one embodiment of the present invention, the character vertical stroke detecting unit selects a connected component having a height similar to the height of the characters and having a direction adjacent to the vertical direction as the candidate vertical stroke.

According to one embodiment of the present invention, the vertical vanishing point detecting unit includes a vertical line segment intersection clustering unit that clusters the point collections formed by intersections of vertical line segments in pairs from the collection composed by direct vertical line segments and indirect vertical line segments to obtain a plurality of clusters; a vertical vanishing point selecting unit that selects the central point of each cluster as a candidate vertical vanishing point, and obtains a weighting coefficient of each candidate vertical vanishing point; a vertical direction perspective projection analyzing unit that performs perspective projection analysis in the vertical direction on the document image with regard to the candidate vertical vanishing points, and obtains another weighting coefficient of each candidate vertical vanishing point; and a vertical vanishing point synthesis analyzing unit that obtains the final vertical vanishing point by analyzing the weighting coefficient obtained by the vertical vanishing point selecting unit and the another weighting coefficient obtained by the vertical direction perspective projection analyzing unit with regard to each candidate vertical vanishing point.

According to one embodiment of the present invention, the vertical line segment intersection clustering unit makes use of the K-Means method to perform the clustering.

According to one embodiment of the present invention, the vertical direction perspective projection analyzing unit (step) performs the projection on each line of the horizontal text line, and synthesizes the results of the projecting analysis of all text lines.

According to one embodiment of the present invention, the vertical vanishing point selecting unit (step) takes a ratio of the number of the intersections contained in the cluster to the number of all intersections as the weighting coefficient of the cluster of the candidate vertical vanishing point.

Moreover, the present invention further provides a computer program which is executable by a computer to carry out the correcting method of the perspective transformed document image according to this invention.

Furthermore, the present invention further provides a computer program which is executable by a computer to make the computer function as the correcting device of the perspective transformed document image according to this invention.

According to yet another aspect of the present invention, the present invention provides a data storage medium which stores thereon said computer program. The storage medium can be any storage media known to a person skilled in the art, such as ROM, floppy disk, flash memory, hard disk, CD, DVD, tape, etc.

Although each of the steps of this invention is described above according to a sequential order, the sequences of these steps are nonetheless adjustable as well as executable in parallel.

Be noted that, in this paper, wordings like "comprise" and "include" indicate existence, and do not exclude the existence of other component parts, that is to say, they denote the meaning of "including but not limited to". For instance, the statement of A comprising/including B means A subsumes B, and may additionally subsume C as well.

As should be noted, all of the foregoing embodiments are exemplary in nature, and should not be understood to restrict the present invention. A person skilled in the art may make various modifications and amendments within the spirit and scope of the present invention, and these modifications and amendments shall be covered by the protection scope of the present invention as long as they fall within the scope as claimed in the claims or analogues thereof.

DRAWINGS ACCOMPANYING THE DESCRIPTION

FIG. 1: 101—perspective transformed document image inputting unit; 102—image diminishing unit; 103—border detecting and binarizing unit; 104—direct horizontal and vertical line segments detecting unit; 105—horizontal text line detecting unit; 106—horizontal vanishing point detecting unit; 107—character vertical stroke detecting unit; 108—vertical vanishing point detecting unit; 109—perspective transformation correcting and converting unit; 110—corrected image outputting unit FIG. 2: 201—perspective transformed document image; 202—image diminishing; 203—border detection and binarization; 204—direct horizontal and vertical line segments detection; 205—horizontal text line detection; 206—direct vertical line segment; 207—direct horizontal line segment, 208—indirect horizontal line segment, 209—horizontal vanishing point detection; 210—horizontal vanishing point, 211—border detection and binarization again; 212—original transformed document image; 213—character vertical stroke detection; 214—indirect vertical line segment; 215—vertical vanishing point detection; 216—vertical vanishing point, 217—perspective transformation correction and conversion; 218—transformation corrected image FIG. 4: 401—binarized document image inputting unit; 402—image smearing processing unit; 403—connected component calculating unit; 404—horizontal text line detecting unit based on analysis of shape and size of the connected component, 405—indirect horizontal line segment outputting unit FIG. 5: 501—binarized document image; 502—image smearing processing; 503—connected component calculation; 504—horizontal text line detection based on analysis of shape and size of the connected component 505—indirect horizontal line segment FIG. 6: 601—long connected component selecting unit; 602—connected component baseline calculating unit; 603—baseline analyzing unit FIG. 7: 701—selection of long connected component; 702—calculation of upper, middle and lower baselines of connected component; 703—analysis of directional relationship between upper and lower baselines FIG. 8: 801—horizontal line segment inputting unit; 802—horizontal line segment intersection clustering unit; 803—candidate horizontal vanishing point selecting unit, 804—horizontal direction perspective projection analyzing unit, 805—horizontal vanishing point synthesis analyzing unit, 806—horizontal vanishing point outputting unit FIG. 9: 901—direct and indirect horizontal line segments; 902—horizontal line segment intersection clustering; 903—candidate horizontal vanishing point selection; 904—horizontal direction perspective projection analysis; 905—horizontal vanishing point synthesis analysis; 906—horizontal vanishing point FIG. 13: 1301—vertical border image inputting unit, 1302—border image connected component calculating unit; 1303—character vertical stroke detecting unit; 1304—indirect vertical line segment outputting unit FIG. 14: 1401—vertical border image; 1402—connected component of border image calculation; 1403—character vertical stroke detection based on analysis of shape and size of connected component 1404—indirect vertical line segment FIG. 15: 1501—vertical line segment inputting unit, 1502—vertical line segment intersection clustering unit, 1503—candidate vertical vanishing point selecting unit; 1504—vertical direction perspective projection analyzing unit, 1505—vertical vanishing point synthesis analyzing unit; 1506—vertical vanishing point outputting unit FIG. 16: 1601—direct and indirect vertical line segments; 1602—vertical line segment intersection clustering; 1603—candidate vertical vanishing point selection; 1604—vertical direction perspective projection analysis; 1605—vertical vanishing point synthesis analysis; 1606—vertical vanishing point

What is claimed is:
1. A correcting device for a perspective transformed document image, said correcting device comprising:
a horizontal vanishing point determining unit, for detecting a horizontal vanishing point of the perspective transformed document image;

a vertical vanishing point determining unit, for detecting a vertical vanishing point of the perspective transformed document image; and a perspective transformation correcting and converting unit, for correcting the perspective transformed document image;

wherein the horizontal vanishing point determining unit comprises a direct horizontal line segment detecting unit, an indirect horizontal line segment detecting unit and a horizontal vanishing point detecting unit, and wherein the horizontal vanishing point detecting unit detects a horizontal vanishing point in accordance with direct horizontal line segments detected by the direct horizontal line segment detecting unit and indirect horizontal line segments detected by the indirect horizontal line segment detecting unit; and wherein the horizontal vanishing point detecting unit comprises:

a horizontal line segment intersection point clustering unit, for clustering point collections formed by intersection points of two horizontal line segments in a collection formed by direct horizontal line segments and indirect horizontal line segments to obtain a plurality of clusters;

a candidate horizontal vanishing point selecting unit, for selecting each cluster as a candidate horizontal vanishing point and obtaining a weight coefficient of each candidate horizontal vanishing point;

a horizontal direction perspective projection analyzing unit, for performing perspective projection analysis in a horizontal direction on the document image with regard to the candidate horizontal vanishing points and obtaining another weight coefficient of each candidate horizontal vanishing point; and a horizontal vanishing point synthesis analyzing unit, for selecting a final horizontal vanishing point in accordance with the weight coefficient and the another weight coefficient of each of the candidate horizontal vanishing points.

2. The correcting device for a perspective transformed document image according to claim 1, characterized in that the horizontal line segment intersection point clustering unit performs clustering by means of a K-Means method.

3. The correcting device for a perspective transformed document image according to claim 1, characterized in that the horizontal vanishing point synthesis analyzing unit combines the another weight coefficient obtained by the horizontal direction perspective projection analyzing unit and the weight coefficient obtained by the candidate horizontal vanishing point selecting unit.

4. The correcting device for a perspective transformed document image according to claim 1, characterized in that the vertical vanishing point determining unit comprises a direct vertical line segment detecting unit, an indirect vertical line segment detecting unit and a vertical vanishing point detecting unit, and that the vertical vanishing point detecting unit detects a vertical vanishing point in accordance with a direct vertical line segment detected by the direct vertical line segment detecting unit and an indirect vertical line segment detected by the indirect vertical line segment detecting unit.

5. The correcting device for a perspective transformed document image according to claim 4, characterized in that the indirect vertical line segment detecting unit comprises:

a connected component calculating unit, for calculating connected components of the document image; and a character vertical stroke detecting unit, for analyzing a shape and size of the connected component, determining a candidate vertical stroke, and analyzing shapes of the connected components of the candidate vertical stroke to obtain a vertical line segment.

6. The correcting device for a perspective transformed document image according to claim 5, characterized in that the character vertical stroke detecting unit selects a connected component whose height is close to the height of the character and whose direction is close to the vertical direction as the candidate vertical stroke.

7. The correcting device for a perspective transformed document image according to claim 4, characterized in that the vertical vanishing point detecting unit comprises:

a vertical line segment intersection point clustering unit, for clustering point collections formed by intersection points of two vertical line segments in a collection formed by the direct vertical line segment and the indirect vertical line segment to obtain a plurality of clusters;

a vertical vanishing point selecting unit, for selecting of each cluster as a candidate vertical vanishing point and obtaining a weight coefficient of each candidate vertical vanishing point;

a vertical direction perspective projection analyzing unit, for performing perspective projection analysis in a vertical direction on the document image with regard to each candidate vertical vanishing point and obtaining another weight coefficient of each candidate vertical vanishing point; and a vertical vanishing point synthesis analyzing unit, for analyzing the weight coefficient obtained by the vertical vanishing point selecting unit and the another weight coefficient obtained by the vertical direction perspective projection analyzing unit with regard to each candidate vertical vanishing point to obtain a final vertical vanishing point.

8. The correcting device for a perspective transformed document image according to claim 7, characterized in that the vertical line segment intersection point clustering unit performs clustering by means of a K-Means method.

9. The correcting device for a perspective transformed document image according to claim 7, characterized in that the vertical direction perspective projection analyzing unit projects each row of horizontal text line and synthesizes a projection analysis result of text lines.

10. The correcting device for a perspective transformed document image according to claim 7, characterized in that the vertical vanishing point selecting unit takes the ratio of the number of intersection points contained in the clusters to the number of all points of intersection as the weight coefficient of the candidate vertical vanishing point.

11. A correcting device for a perspective transformed document image, said correcting device comprising:

a horizontal vanishing point determining unit, for detecting a horizontal vanishing point of the perspective transformed document image;

a vertical vanishing point determining unit, for detecting a vertical vanishing point of the perspective transformed document image; and a perspective transformation correcting and converting unit, for correcting the perspective transformed document image;

wherein the vertical vanishing point determining unit comprises a direct vertical line segment detecting unit, an indirect vertical line segment detecting unit and a vertical vanishing point detecting unit, and wherein the vertical vanishing point detecting unit detects a vertical vanishing point in accordance with direct vertical line segments detected by the direct vertical line segment detecting unit and indirect vertical line segments detected by the indirect vertical line segment detecting unit; and wherein the vertical vanishing point detecting unit comprises:

a vertical line segment intersection point clustering unit, for clustering point collections formed by intersection points of every two vertical line segments in a collection formed by the direct vertical line segment and the indirect vertical line segment to obtain a plurality of clusters;

a vertical vanishing point selecting unit, for selecting the central point of each cluster as a candidate vertical vanishing point and obtaining a weight coefficient of each candidate vertical vanishing point;

a vertical direction perspective projection analyzing unit, for performing perspective projection analysis in a vertical direction on the document image with regard to each candidate vertical vanishing point and obtaining another weight coefficient of each candidate vertical vanishing point; and a vertical vanishing point synthesis analyzing unit, for analyzing the weight coefficient obtained by the vertical vanishing point selecting unit and the another weight coefficient obtained by the vertical direction perspective projection analyzing unit with regard to each candidate vertical vanishing point to obtain a final vertical vanishing point.

12. The correcting device for a perspective transformed document image according to claim 11, characterized in that the indirect vertical line segment detecting unit comprises:

a connected component calculating unit, for calculating connected components of the document image; and a character vertical stroke detecting unit, for analyzing a shape and size of the connected component, determining a candidate vertical stroke, and analyzing shapes of the connected components of the candidate vertical stroke to obtain a vertical line segment.

13. The correcting device for a perspective transformed document image according to claim 12, characterized in that the character vertical stroke detecting unit selects a connected component whose height is close to the height of the character and whose direction is close to the vertical direction as the candidate vertical stroke.

14. The correcting device for a perspective transformed document image according to claim 11, characterized in that the vertical line segment intersection point clustering unit performs clustering by means of a K-Means method.

15. The correcting device for a perspective transformed document image according to claim 11, characterized in that the vertical direction perspective projection analyzing unit projects each row of horizontal text line and synthesizes a projection analysis result of text lines.

16. The correcting device for a perspective transformed document image according to claim 11, characterized in that the vertical vanishing point selecting unit takes the ratio of the number of intersection points contained in the clusters to the number of all points of intersection as the weight coefficient of the candidate vertical vanishing point.

17. A correcting method for a perspective transformed document image, carried out by a correcting device for a perspective transformed document image, said correcting method comprising:

a horizontal vanishing point determining step, for detecting a horizontal vanishing point of the perspective transformed document image;

a vertical vanishing point determining step, for detecting a vertical vanishing point of the perspective transformed document image; and a perspective transformation correcting and converting step, for correcting the perspective transformed document image;

wherein the horizontal vanishing point determining step comprises a direct horizontal line segment detecting step, an indirect horizontal line segment detecting step and a horizontal vanishing point detecting step, and wherein the horizontal vanishing point detecting step detects a horizontal vanishing point in accordance with a direct horizontal line segment detected by the direct horizontal line segment detecting step and an indirect horizontal line segment detected by the indirect horizontal line segment detecting step, and wherein the horizontal vanishing point detecting step comprises:

clustering point collections formed by intersection points of every two horizontal line segments in a collection formed by all direct horizontal line segments and indirect horizontal line segments to obtain a plurality of clusters;

selecting the central point of each cluster as a candidate horizontal vanishing point and obtaining a weight coefficient of each candidate horizontal vanishing point;

performing perspective projection analysis in a horizontal direction on the document image with regard to the candidate horizontal vanishing point and obtaining another weight coefficient of each candidate horizontal vanishing point; and selecting a final horizontal vanishing point in accordance with the weight coefficient and the another weight coefficient of each of the candidate horizontal vanishing point.

18. A correcting method for a perspective transformed document image, carried out by a correcting device for a perspective transformed document image, said correcting method comprising:

a horizontal vanishing point determining step, for detecting a horizontal vanishing point of the perspective transformed document image;

a vertical vanishing point determining step, for detecting a vertical vanishing point of the perspective transformed document image; and a perspective transformation correcting and converting step, for correcting the perspective transformed document image;

wherein the vertical vanishing point determining step comprises a direct vertical line segment detecting step, an indirect vertical line segment detecting step and a vertical vanishing point detecting step, and wherein the vertical vanishing point detecting step detects a vertical vanishing point in accordance with a direct vertical line segment detected by the direct vertical line segment detecting step and an indirect vertical line segment detected by the indirect vertical line segment detecting step, and wherein the vertical vanishing point detecting step comprises:

clustering point collections formed by intersection points of every two vertical line segments in a collection formed by the direct vertical line segment and the indirect vertical line segment to obtain a plurality of clusters;

selecting the central point of each cluster as a candidate vertical vanishing point and obtaining a weight coefficient of each candidate vertical vanishing point;

performing perspective projection analysis in a vertical direction on the document image with regard to each candidate vertical vanishing point and obtaining another weight coefficient of each candidate vertical vanishing point; and
analyzing the weight coefficient obtained by the selecting and the another weight coefficient obtained by the performing and obtaining with regard to each candidate vertical vanishing point to obtain a final vertical vanishing point.

* * * * *